J. Wallwork,
Hand Saw.
No. 86,889. Patented Feb. 9, 1869.
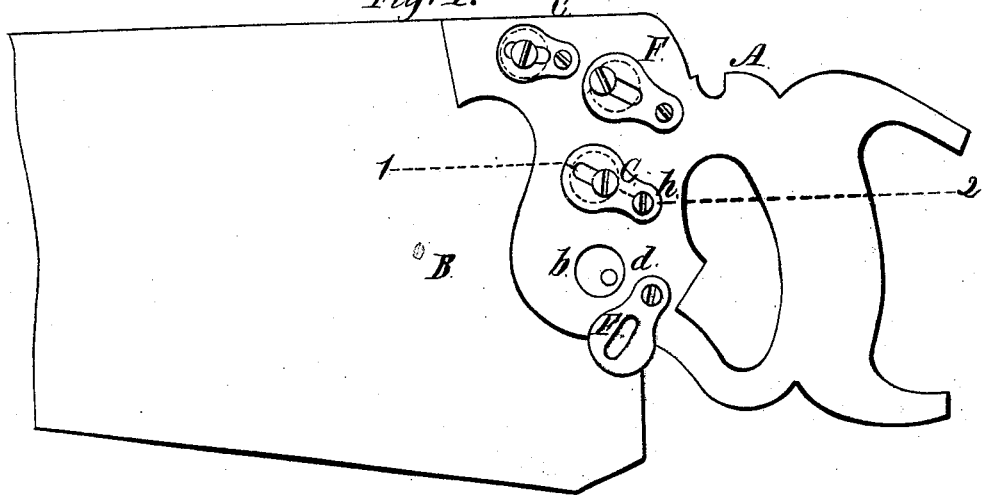
Fig. 1.
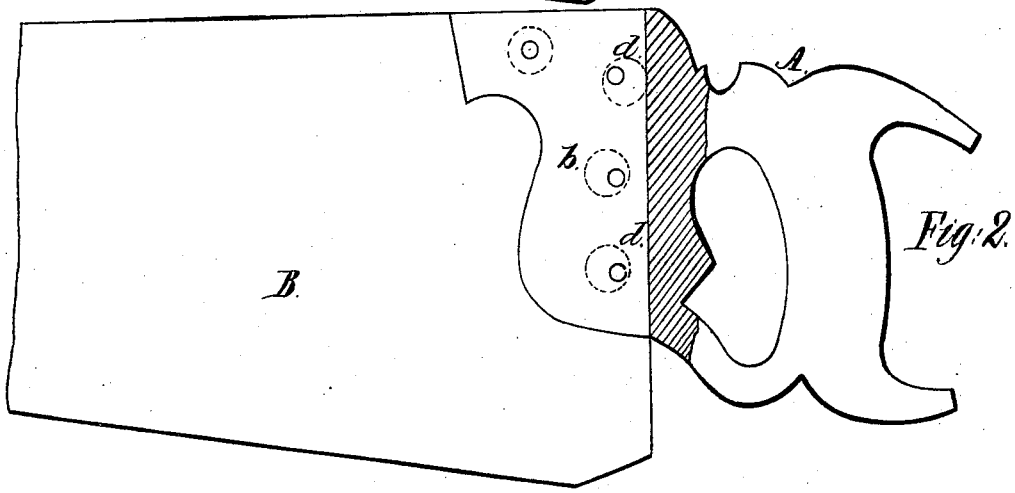
Fig. 2.
Fig. 3.
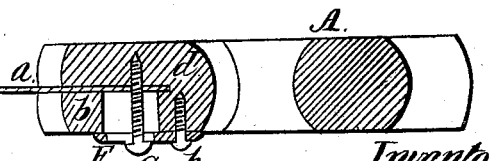
Witnesses:
Wm A Steel
John Parker
Inventor:
J. Wallwork
by his Attorney
Henry Howson

JOHN WALLWORK, OF PHILADELPHIA, PENNSYLVANIA.

Letters Patent No. 86,889, dated February 9, 1869.

IMPROVEMENT IN ATTACHING HANDLES TO SAWS.

The Schedule referred to in these Letters Patent and making part of the same

*To all whom it may concern:*

Be it known that I, JOHN WALLWORK, of Philadelphia, Pennsylvania, have invented an Improvement in Hand-Saws; and I do hereby declare the following to be a full, clear, and exact description of the same.

My invention consists in passing the screws which fasten the handle to the blade of a saw through adjustable slotted plates, and through openings in the handle sufficiently large in diameter to permit the said screws to be adjusted laterally until brought in line with the holes in the saw-blade, all as fully described hereafter, the object of my invention being to facilitate the attachment of saw-handles to blades in which the holes for the fastening-screws have been already punched.

In order to enable others skilled in the art to make and use my invention, I will now proceed to describe the mode of constructing and using the same, reference being had to the accompanying drawing, which forms a part of this specification, and in which—

Figure 1 is a side view of part of a hand-saw with my improvement;

Figure 2, the same, partly in section; and

Figure 3, a sectional view on the line 1, 2, fig. 1.

A represents the handle, and B, the blade of a hand-saw, the former having the usual incision *a* for the admission of the rear end of the blade, to which it is fastened by the screws C.

The positions of the holes which are made in a saw-handle for the passage of the fastening-screws, are determined, not by actual measurement, but by the aid of the eye alone, so that, although by long practice the operator is enabled to make these holes in very nearly the same positions in each handle, the variation is sufficient to demand that holes should be punched in each plate to correspond in position with those of that particular handle which is to be fastened to it.

It consequently happens that a handle can be fitted to no other saw-blade than the one for which it is especially intended, unless other holes be punched.

Although, in manufacturing the saws, this plan results in but little inconvenience, it is found to be very objectionable when a handle is broken at a place remote from a saw-factory, for, as no other handle can be fitted to the blade until new holes are punched in the latter, it must often, in the absence of proper tools, be thrown aside as useless.

To overcome this objection, I construct the handle, as I will now proceed to describe, so that it can be fastened to any saw-blade in which the holes have been previously punched.

Instead of making holes in the handle, of the same diameter as that of the fastening-screws, I form openings *b* in the same, having a diameter large enough to cover the slight variations in position of the holes *d* in the saw-blade. (See fig. 2.)

These openings are covered by slotted plates F, so pivoted to the handle by screws or pins *h*, that they can be adjusted to any position over the said openings, or turned to one side from the same, as shown in fig. 1.

The fastening-screws C are passed through the slots *i* in these plates, and the latter are so turned that, when the screws are properly adjusted in the slots, their points shall be directly opposite to the holes *d* of the saw-blade, through which they are passed, and screwed into the wood on the opposite side of the handle, as seen in fig. 3.

It will be evident, without further description, that a handle constructed as above described, can be fitted and fastened to any saw-blade, notwithstanding the slight variations that may occur in the positions of the holes.

I claim as my invention, and desire to secure by Letters Patent—

The saw-handle A, provided with slotted plates F, screws C, and openings *b*, the whole being constructed and arranged substantially as herein described, for the purpose specified.

In testimony whereof, I have signed my name to this specification, in the presence of two subscribing witnesses.

JOHN WALLWORK.

Witnesses:
JOHN WHITE,
LOUIS BOSWELL.